United States Patent [19]
Conaway

[11] Patent Number: 5,797,701
[45] Date of Patent: Aug. 25, 1998

[54] METHOD OF TREATING ORGANIC CONTAMINATED MATERIALS

[75] Inventor: Lawrence M. Conaway, Youngstown, N.Y.

[73] Assignee: Continuium Environmental Inc., Youngstown, N.Y.

[21] Appl. No.: 807,643

[22] Filed: Feb. 27, 1997

[51] Int. Cl.$^6$ .................. B09C 1/02; B09C 1/08
[52] U.S. Cl. .................. 405/128; 210/199; 210/202; 210/759; 588/205; 588/900
[58] Field of Search .................. 405/128; 210/758, 210/759, 787, 806, 199, 202; 588/205, 900

[56] References Cited

U.S. PATENT DOCUMENTS

| | | | |
|---|---|---|---|
| 4,230,571 | 10/1980 | Dadd | 210/760 |
| 4,416,786 | 11/1983 | Knorre et al. | 210/746 |
| 4,504,445 | 3/1985 | Walz | 422/186.15 |
| 4,591,443 | 5/1986 | Brown et al. | 210/747 |
| 4,927,293 | 5/1990 | Campbell | 405/128 |
| 5,178,762 | 1/1993 | Pokora et al. | 210/759 X |
| 5,259,962 | 11/1993 | Later | 210/758 |
| 5,264,654 | 11/1993 | Kreft et al. | 588/900 X |
| 5,295,761 | 3/1994 | Heacock et al. | 405/128 |
| 5,304,710 | 4/1994 | Kigel et al. | 405/128 X |
| 5,368,411 | 11/1994 | Losack et al. | 405/128 |
| 5,550,312 | 8/1996 | Schingnitz et al. | 588/205 |
| 5,599,137 | 2/1997 | Stephenson et al. | 405/128 |
| 5,637,154 | 6/1997 | Shorthouse | 588/900 X |

Primary Examiner—George A. Suchfield
Attorney, Agent, or Firm—Harris Beach & Wilcox LLP.

[57] ABSTRACT

Friable solid material contaminated by oxidizable hydrocarbons such as petrochemicals is delivered into a system wherein that material is subjected to a series of physical and chemical reactions to separate the contaminants from the solid material. The system can receive solid material, separate coarse and fine material and suspend the fine material in an aqueous medium. The aqueous suspension is subjected to temperature adjustment and the addition of an oxidizing agent preferably hydrogen peroxide. The suspension is agitated for a period of time to allow the hydrocarbons to be oxidized. The gaseous oxidation products are stripped and separated from the residual solid material. The aqueous suspension of solid material and diluent are physically separated and the solid material may be returned to its point of origin after treatment. The process and apparatus for carrying out the process are preferably applied to soils containing hydrocarbon pollutants.

17 Claims, 1 Drawing Sheet

METHOD OF TREATING ORGANIC CONTAMINATED MATERIALS

FIELD OF THE INVENTION

This invention relates generally to a method of treating organic contaminated materials, and more specifically to treating contaminated material in an aqueous solution which contains an active oxidizing reagent.

BACKGROUND OF THE INVENTION

The present invention relates generally to the process of separating solid organic contaminated materials into distinct particle sizes that are suspended in an aqueous solution. The resulting suspension is subjected to an oxidizing reagent resulting in the generation of organic gases. The residual suspension is then processed in order to separate the aqueous phase from the original solid material.

The environmental need for the process of the present invention is directly applicable to the decontamination of petroleum hydrocarbon laden soils. The U.S. Environmental Protection Agency (US EPA) has determined that the majority of environmental contamination is through the production and use of petroleum products resulting in millions of tons of contaminated soils. The consistent economic impact of remediation of this soil has a direct relationship to the cost of petroleum production. Furthermore, it has been mandated through U.S. legislation that petroleum producers and subsequent end users be required to decontaminate those soils.

The prior art teaches that in the decontamination of petroleum hydrocarbons in aqueous waste streams employing oxidizing agents such as ozone or hydrogen peroxide is beneficial in the process of decontamination. For example, U.S. Pat. No. 4,230,571 to Dodd and U.S. Pat. No. 4,504,445 to Walz describe the utilization of ozone in the treatment of oil in water. Similarly U.S. Pat. No. 4,416,786 to Knorre et al. and U.S. Pat. No. 4,591,443 to Brown et al. describe the use of hydrogen peroxide in the decontamination of waste waters.

The application of oxidizing agents in the treatment of solid contaminated wastes is described in U.S. Pat. No. 4,927,293 to Campbell and U.S. Pat. No. 5,259,962 to Later. In both applications, the employment of oxidizing agents on solid material in a non-aqueous state is described. The subsequent treatment of the evolving organic gases with the radiation of ultra violet light (UV) in the Later process further oxidizes the organic gases into carbon dioxide gas.

Prior art applications in the decontamination of petroleum hydrocarbons with the use of oxidizing agents employs the induction of an oxygen atom onto the hydrocarbon molecule thus lysing the molecule into smaller molecules called hydroxyl radicals. Subsequent exposure to UV light further reduces these hydroxyl radicals to carbon dioxide. These oxidation reactions have been defined in *Oxidation Mechanisms: Applications in Organic Chemistry*, by Stewart & Ross. The above-described prior art applications that treat solid materials reduce the levels of petroleum hydrocarbons, but not to the degree required to meet current regulatory requirements.

The present invention allows for contaminated material to be processed in an aqueous state, affording a more effective reaction on highly contaminated material. The resultant hydroxyl radical gases are not treated with a secondary oxidation source such as ozone or UV light to be oxidized further to carbon dioxide, but instead are employed as a beneficial fuel source. Through the treatment process of the present invention, the dispersion of large agglutinated oil/soil lumps through physical and chemical reactions into fine individual particle sizes, enables a high reduction of contaminants that meet regulatory levels on fine silt and clay materials.

SUMMARY OF THE INVENTION

It is therefore an object of the present invention to provide for a novel and economical treatment process for contaminated materials which overcomes the problems of the prior art described above.

It is a further object of the present invention to provide a highly efficient and effective process for treating contaminated materials in an aqueous media.

It is yet another object of the present invention to provide for a novel method of treating contaminated material which allows for a large volume of material to be treated economically and efficiently to meet current regulating requirements for toxic materials.

With the present invention, a method and process of treatment is provided that decontaminates highly saturated petroleum hydrocarbons in friable solid materials, such as soils, at an economical cost in comparison to currently available prior art treatment processes. In a preferred embodiment, a suspension of solid material is treated with an oxidizing reagent in an aqueous state in a closed system reactor unit.

In accordance with the present invention, enables the active dispersion of fine particles is effectively saturated with oxidizer, causing principally gas molecules having one or more oxy or hydroxy groups to be generated. The generated hydroxyl radical gases are vented through the closed system such that these gases can be beneficially employed to supply a needed system fuel source.

The method and process of treatment allows for a large volume of material to be treated with the efficiency to meet current regulatory limits thus processing listed toxic materials into non-toxic reusable material.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which.

DETAILED DESCRIPTION OF THE INVENTION

Figure 1:
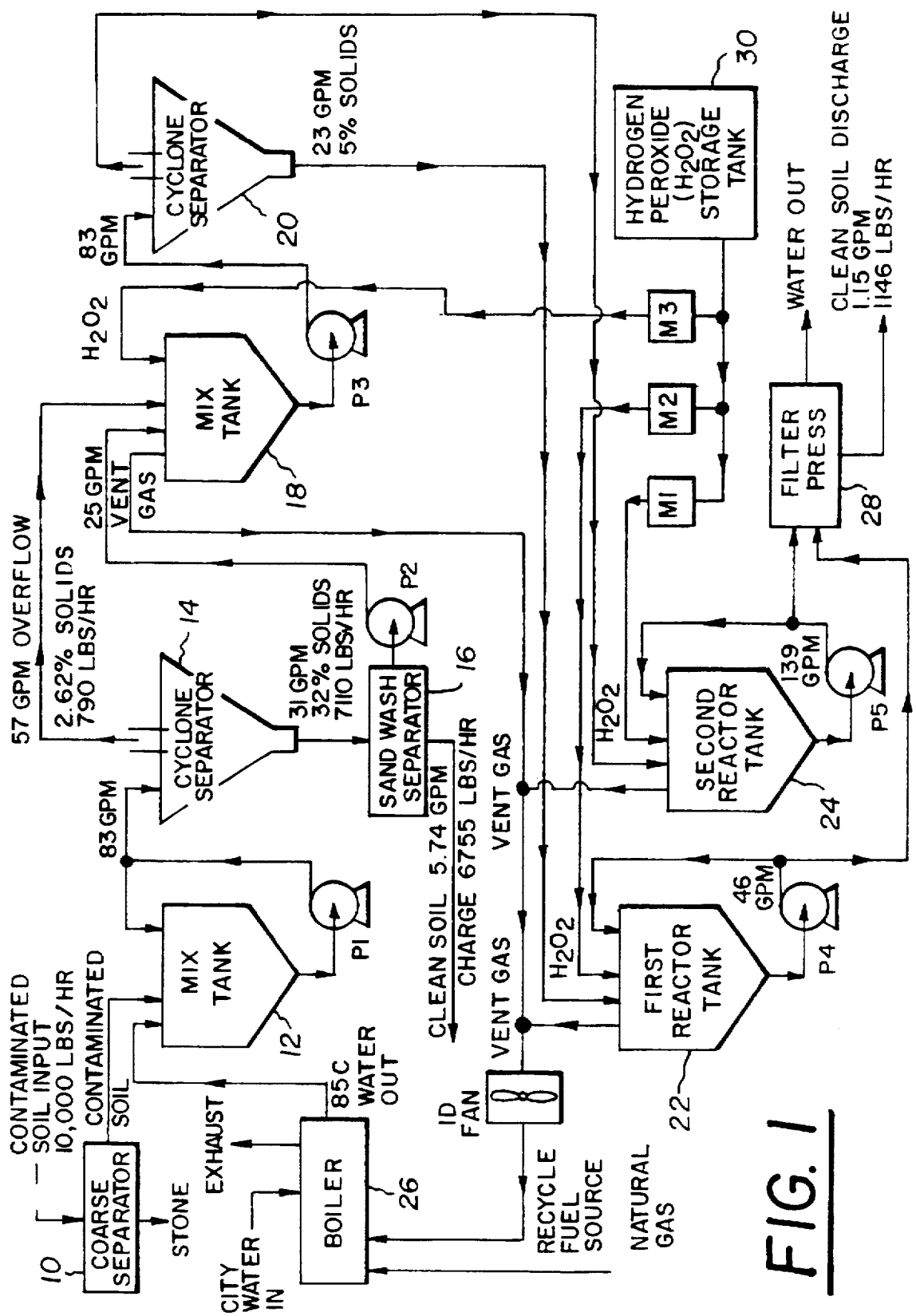
FIG. 1 is a schematic representation of a flow diagram which illustrates the present invention.

From the schematic representation of the present invention as illustrated in FIG. 1, contaminated material enters the system through a coarse separator 10 that removes all material that has a particle size of 2 mm and larger. The contaminated material that is finer than 2 mm is forwarded to a first mix tank 12 where water at 85° C. is introduced, and the resulting slurry is mixed to a homogeneous consistency by pump P1. After the appropriate consistency is reached, the slurry is delivered to cyclone separator 14 that removes material that has a particle size of from about 1 to 2 mm, defined in this process as "sand". This sand material is processed through a sand wash separator 16 and discharged to a container.

The finer material discharged from sand wash separator 16 is forwarded to a second mix tank 18 by pump P2. The material delivered to mix tank 18 is then treated with the first addition of hydrogen peroxide ($H_2O_2$). Upon completion of the addition of hydrogen peroxide, the material is delivered to a second cyclone separator 20 by pump P3. Cyclone separator 20 separates the material having a particle size greater than about 0.074 mm which is delivered to a first reactor tank 22. At this point, more hydrogen peroxide is added to the first reactor tank 22 in a sufficient amount to oxidize at least a portion of the remaining contaminated material. The material is circulated to a homogeneous consistency by pump P4. The material from the cyclone separator 20 that is finer than about 0.074 mm is delivered to a second reactor tank 24 and similarly more hydrogen peroxide is added sufficient to oxidize at least a portion of the contaminated material and mixed by pump P5.

The hydrogen peroxide is supplied from storage tank 30 and metered by meter boxes M1, M2 and M3 to mix tank 18 and reactor tanks 22 and 24 respectively. The meter boxes control the flow and amount of hydrogen peroxide delivered to a particular treatment location.

The resulting gases generated through the above-described process, whether from mix tank 18 or reactor tanks 22 and 24 are vented from these tanks by an induced draft (ID) fan that can supply recycled fuel to support the operation of boiler 26. The materials in tanks 22 and tank 24 are recycled by pumps P4 and P5, respectively, as shown in FIG. 1, with repeated addition of $H_2O_2$ to the vessels as required to achieve the desired reduction in hydrocarbon content of the soils. After a reaction time of between about 8 and 16 minutes, the material is discharged from both reactor tanks 22 and 24 by both pumps P4 and P5 to a filter press 28. The discharged material, now decontaminated, is de-watered and the resulting solid material is returned to its point of origin.

In the schematic of FIG. 1, the slurry is pumped from station to station through interconnecting pipes schematically illustrated by the lines and arrows by a series of centrifugal pumps P1–P5.

The pipes and pumps are constructed of a material which is inert to the oxidizing component (i.e., $H_2O_2$). The pipes can be made of high density polypropylene or high density polyethylene. The internal pump impellers should also be made of the same high density organic pipe material. The pipe size and pump capacity is well within the selection of one skilled in the art depending upon the amount of slurry transfer desired.

As previously stated, the oxidation reactions of peroxides and petroleum hydrocarbons and their radical byproducts are well known. In determining the parameters of the present invention, the following contaminated soil factors and data were considered:

Physical
    Particle size
    Percent Oil & Grease
    Percent Water & Volatiles @ 105 degrees C.
Chemical
    Baseline analysis of petroleum analytes
    Analysis of off gases from reaction
    Analysis of residual organic compounds
    Reduction of total Oil & Grease
    Upper and Lower limits of reaction for:
        Water content
        Quantity of Peroxide/weight oil
        Temperature range
        Time of reaction All analytical methods employed were state-of-the-art US EPA methodologies which are tabulated with the respective data in the specific tables and graphs below.

For the purpose of establishing the parameters of the oxidation reaction, a single soil sample was employed in the testing and development of the process. The sample comprises a refinery contaminated soil. The use of a homogeneous soil that reflects a real site condition was necessary in defining the parameters of the oxidation reaction.

The soil was pre-processed through a number #10 US Standard sieve, i.e. having a mesh opening to pass particle size of 2.00 mm and smaller. Most of the hydrocarbons in soil are found adsorbed on fines less than 2mm in size rather than in larger rocks. Therefore on a percent weight for the large rock would already have a minimal oil content and not pose a meaningful environmental problem. The particle size analysis on the refinery contaminated soil showed that the percent of material that passed through a #10 sieve was 27%.

Table 1 lists the baseline parameters of the preprocessed refinery contaminated soil which are determined by American Society of Testing Materials (ASTM) Physical Methods for Soil.

TABLE 1

| Physical Baseline Parameters | |
|---|---|
| Percent Oil & Grease | 6.41% |
| Percent Water & Volatiles @ 105° C. | 5.10% |
| Bulk Density | 2.63 |
| Absolute Density | 2.27 |

The analysis of the organic constituents of the refinery contaminated soil was performed with two separate methods, one for the volatile organics and the second for the heavier semi-volatiles and is tabulated below in Tables 2 and 3, respectively. Both methodologies employ the use of a Gas Chromatograph/Mass Spectrometer (GC/MS) that will not only identify the listed analytes of concern but also through the use of the mass spectra, the unknown compounds can be library searched through a National Institute of Standards Technology (NIST) spectral data base of organic compounds.

TABLE 2

| Chemical Baseline Analysis EPA Method 8240 Volatile Organics | |
|---|---|
| Analyte: | Results as % of Total O&G: |
| Benzene | ND |
| Toluene | ND |
| Ethyl Benzene | ND |
| o-Xylene | .002 |
| m & p-Xylenes | .004 |
| Isopropylbenzene | .009 |
| n-Propylbenzene | .008 |
| p-Isopropyltoluene | .006 |
| 1,2,4-Trimethylbenzene | .006 |
| 1,3,5-Trimethylbenzene | .018 |
| n-Butylbenzene | .020 |
| sec-Butylbenzene | .027 |
| tert-Butylbenzene | ND |
| Naphthalene | .047 |
| Aliphatics C1 thru C10 (Undefined) | 2.72 |

TABLE 3

Chemical Baseline Analysis
EPA Method 8270 Semi-Volatile Organics

| Analyte: | Results as % of Total O&G: |
|---|---|
| Naphthalene | .047 |
| Acenaphthylene | .017 |
| Acenaphthene | .236 |
| Fluorene | .213 |
| Phenanthrene | .549 |
| Anthracene | .497 |
| Fluoranthene | .359 |
| Pyrene | 1.280 |
| Benzo (a) Anthracene | 2.256 |
| Chrysene | 1.354 |
| Benzo (b) Fluoranthene | 3.112 |
| Benzo (k) Fluoranthene | 2.423 |
| Benzo (a) Pyrene | 1.558 |
| Indeno (1,2,3-cd) Pyrene | .183 |
| Dibenzo (a,h) Anthracene | 4.032 |
| Benzo (g,h,i) Perylene | 1.278 |
| Aliphatics C11 thru C38 (undefined) | 77.68 |

With the baseline values established for both listed regulated analytes and the aliphatics, the soil was subjected to an aqueous peroxide saturation and allowed to carry on to completion. The analytical values were then compared before and after treatment yielding the following results in comparison to the most stringent guidelines from the New Jersey Department of Environment and Energy. These results are listed in Table 4.

TABLE 4

Polynuclear Aromatic Hydrocarbons
Reduction By Oxidation Stripping

| Analyte | Baseline mg/Kg | Treated mg/Kg | N.J. Standards (residential mg/Kg) |
|---|---|---|---|
| Naphthalene | 2.25 | .047 | 230. |
| Acenaphthylene | .75 | <.02 | NA |
| Acenaphthene | 11.3 | <.02 | 3,400. |
| Fluorene | 10.2 | <.02 | 2,300. |
| Phenanthrene | 26.3 | .178 | NA |
| Anthracene | 23.8 | .095 | 10,000. (1) |
| Fluoranthene | 17.2 | .176 | 2,300 |
| Pyrene | 61.3 | .400 | 1,700. |
| Benzo (a) Anthracene | 108. | <.02 | .09 |
| Chrysene | 64.8 | .835 | 9.0 |
| Benzo (b) Fluoranthene | 149. | <.02 | 0.9 |
| Benzo (k) Fluoranthene | 116. | <.02 | 0.9 |
| Benzo (a) Pyrene | 74.6 | .515 | 0.66 |
| Indeno (1,2,3-cd) Pyrene | 8.75 | <.02 | 0.9 |
| Dibenzo (a,h) Anthracene | 193. | <.02 | 0.66 |
| Benzo (g,h,i) Perylene | 61.2 | <.02 | NA |

NA = Not Applicable/Not Listed
(1) = The relatively high standards are determined by the toxicity of each analyte. Not to exceed 1.0% by weight or 10,000 PPM.

Additional analyses were performed on the identification of the analytes that are generated in the subsequent reactions. Both the water phase was analyzed, as well as the actual off gases generated in the reaction. Listed below in Table 5 are the identified compounds observed in the water phase.

TABLE 5

EPA Method 8240 Volatile Organics Water Phase

| Analyte | % of Total Organic Gas |
|---|---|
| 2-Methyl-1-Propene | 28.2 |
| Hydroxy-Acetaldehyde | 32.6 |
| 2-Propanol | 8.4 |
| Cyclopropane | 4.5 |
| 2-Heptanone | 11.6 |
| 2-Pentanone | 8.8 |
| 2-Methyl-2-Propenal | 1.2 |
| 4-Methyl-2-Heptanone | 1.6 |
| Undefined | 3.1 |

A modified method of analysis was employed to identify the complete off gases generated by the reaction. This method was a micro reaction with 0.5 grams of refinery contaminated soil in a closed reactor. Added to the reactor was 2.5 mls of Deionized (DI) water followed by 2.0 mls of 30% Hydrogen Peroxide.

From the reactor, the subsequent gases generated were concentrated with a purge & trap instrument. The resulting gases were then swept into the GC/MS with a Helium carrier gas and analyzed through the NIST library search yielding the following results which are tabulated in Table 6.

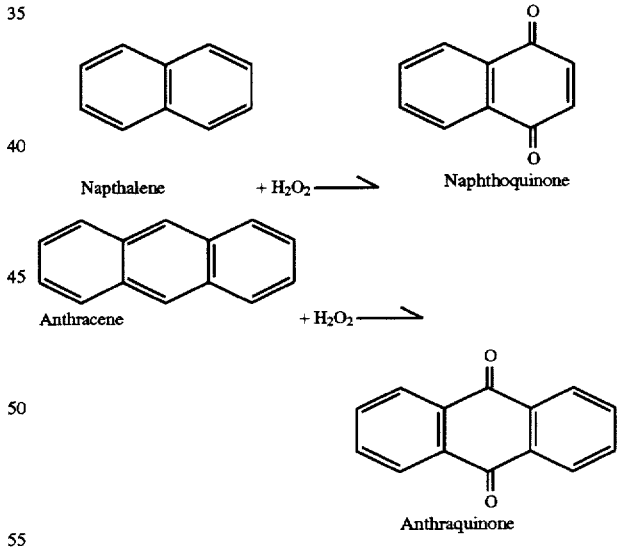

The final analysis of the off gases was conducted to determine the volume of gas generated on a volume to volume basis. In this test a 50 gram sample was added to 200 mls of DI Water at 85 degrees C. and saturated with hydrogen peroxide. The gases generated were then measured at ambient pressure with a glass bubble flow meter and yielded 910 cc of gas. It was calculated that at 6.41% oil & grease, the 50 grams soil would yield 3.205 grams of oil. Therefore one cc of oil will generate approximately 284 cc of gas.

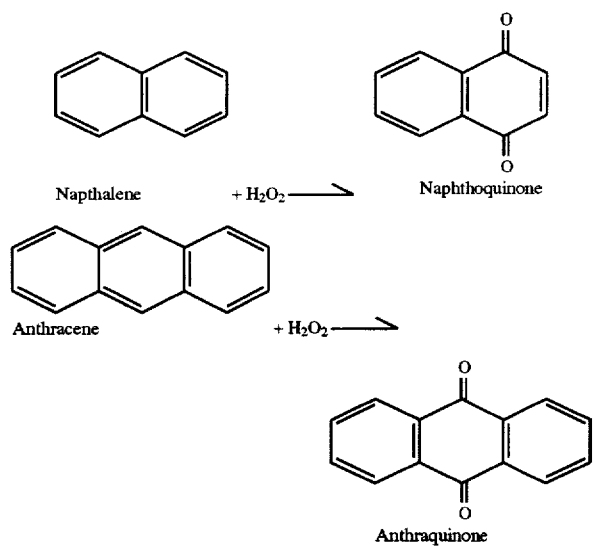

Process Parameters

The following describes the results of tests performed to establish the specifications of the oxidation process. The specific variables such as water content, quantity of hydrogen peroxide, temperature, and time of reaction were individually reacted and analyzed for their reduction of oil content from the baseline values. The method employed to monitor this reduction was a simple extraction of the reacted soil after drying. The soil is extracted of its oil with Methylene Chloride solvent and this extracted solvent is then removed by heating in a controlled vessel that leaves only the residual oil to be weighed. It should also be stated that these values are merely relative to the reduction of oil for effectiveness and are not indicative of the process in its entirety. All of the following results are reported as a percent reduction of oil content of the soil.

WATER

Set parameters:
  50 grams of soil
  50 mls $H_2O_2$
  Temperature @ 85° C.

| Variable Parameters: | | |
|---|---|---|
| Volume Water | % Oil & Grease | % Reduction |
| 0 mls | 6.17 | 3.7 |
| 25 mls | 4.77 | 25.6 |
| 50 mls | 4.79 | 25.3 |
| 100 mls | 4.61 | 28.1 |
| 200 mls | 3.69 | 42.4 |

HYDROGEN PEROXIDE

Set parameters:
  50 grams of soil
  200 mls DI Water
  Temperature @ 85° C.

| Variable Parameters: | | |
|---|---|---|
| Volume $H_2O_2$ | % Oil & Grease | % Reduction |
| 0 mls | 6.41 | 0 |
| 10 mls | 4.77 | 25.6 |
| 25 mls | 2.70 | 57.9 |
| 50 mls | 2.52 | 60.7 |
| 100 mls | 2.34 | 63.5 |

TEMPERATURE

Set parameters:
  50 grams of soil
  200 mls DI water
  50 mls $H_2O_2$

| Variable Parameters: | | |
|---|---|---|
| Temp. °C. | % Oil & Grease | % Reduction |
| 45 | 5.22 | 18.6 |
| 55 | 5.56 | 13.3 |
| 65 | 4.88 | 23.9 |
| 75 | 4.60 | 28.2 |
| 85 | 1.37 | 78.6 |
| 95 | 2.53 | 60.5 |

TIME

The reaction time of the process when given the above conditions is near immediate with the exception that the absorption rate of the hydrogen peroxide into the actual particulate dispension delays the reaction time. No extracted recovery of oil and grease was employed in this study of time. Rather a measurement of visible activity was timed. In each case the time of reaction had a duration of 8 to 12 minutes. These measurements were incorporated into the design of the field process unit being engineered. The resonance time of the reaction for this process unit is set at 16 minutes.

From the observed results of the bench scale testing, the following summations can be made with respect to the method of operation, these being, that the ratio of water to material should be 4:1 or less and further, that the ratio of hydrogen peroxide applied to the suggested water to material ratio is determined by the concentration of oil and grease found in the material being treated, i.e. in sufficient quantity to completely react. For this reason, no set hydrogen peroxide concentration can be given due to the changing amount of oil and grease found in the material to be treated. However, a suitable operating concentration range for the hydrogen peroxide is from about 5 to 25 percent by volume of the aqueous solution. Temperature the reaction is most effective from about 70° C. to 90° C. Finally, the time factor is preferably 8 to 16 minutes enabling a sufficient operational time to effectively vent the evolving organic gases.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of decontaminating soil containing hydrocarbon pollutants comprising the steps of:
   (a) providing a series of independent treating stations which include a heated aqueous solution, which solution contains an oxidizing component, said stations being interconnected by piping means for moving fluidized solid particulate material from station to station;
   (b) introducing contaminated soil into said heated aqueous solution to form said fluidized solid particulate material;
   (c) moving said soil material from station to station; and
   (d) oxidizing the hydrocarbons in said soil material by direct chemical reaction with said oxidizing component.

2. The method of claim 1 in which the oxidizing component is hydrogen peroxide.

3. The method of claim 2 in which the concentration of hydrogen peroxide is between about 5 percent and about 25 percent by volume of the aqueous solution.

4. The method of claim 1 in which the temperature of the aqueous solution is in the range of about 70° C. to about 90° C.

5. A method of treating contaminated soil which contains hydrocarbon pollutants, comprising the steps of:
   (a) processing said soil to select a portion of said soil in a predetermined size range;
   (b) exposing said selected soil portion to a heated aqueous solution which contains hydrogen peroxide to permit said hydrogen peroxide to oxidize at least a portion of the hydrocarbon pollutant contained in the soil.

6. The method of claim 5 in which the concentration of hydrogen peroxide is between about 5 percent and about 25 percent by volume of said aqueous solution.

7. The method of claim 5 in which the soil is treated at a solution temperature in the range of about 70° C. to about 90° C. for between about 8 minutes and about 16 minutes for each batch of soil treated.

8. A method for remediation of contaminated soil which contains hydrocarbons at an environmentally unacceptable level, comprising the steps of:
   (a) sizing said contaminated soil to a predetermined size range;
   (b) treating said sized soil at a mixing station in an aqueous solution containing an oxidant to at least partially reduce the hydrocarbon content of said soil;
   (c) separating said treated soil into first and second components; and
   (d) treating said first and second components with aqueous hydrogen peroxide until all of said contaminated soil has reached an environmentally acceptable level of hydrocarbon content.

9. The method of claim 8 in which said oxidant is hydrogen peroxide.

10. The method of claim 9 in which the concentration of hydrogen peroxide is between about 5 percent and about 25 percent by volume of said aqueous solution.

11. The method of claim 10 wherein for each batch of soil having an initial total hydrocarbon content of at least 1 percent oil and grease said treating step is carried out at a solution temperature between about 70° C. and about 90° C. for between about 8 minutes and about 16 minutes.

12. The method of claim 8 in which the size of the soil particles in step (a) is no greater than about 2 mm.

13. An apparatus for remediating contaminated soil, said apparatus including a series of interconnected stations comprising:
   (a) means for processing a contaminated soil into a particulate portion having a predetermined size range;
   (b) means for treating said particulate portion in an aqueous oxidizing solution to reduce the level of hydrocarbons in said particulate portion;
   (c) means for separating said treated particulate portion into first and second components; and
   (d) means for further treating said first and second components with aqueous hydrogen peroxide until said contaminated soil reaches an environmentally acceptable level of hydrocarbon content.

14. The apparatus of claim 13 in which said processing and treating means are interconnected by piping means for moving an aqueous particulate dispersion of contaminated soil particles under pressure from station to station.

15. The method of claim 5 wherein said hydrogen peroxide is present in said solution in a concentration sufficient to oxidize a major portion of the hydrocarbon pollutant contained in said soil.

16. The method of claim 1 further comprising the step of removing said oxidized hydrocarbons from said soil.

17. The method of claim 16 further comprising the step of collecting said oxidized hydrocarbons.

* * * * *